Figure 1:
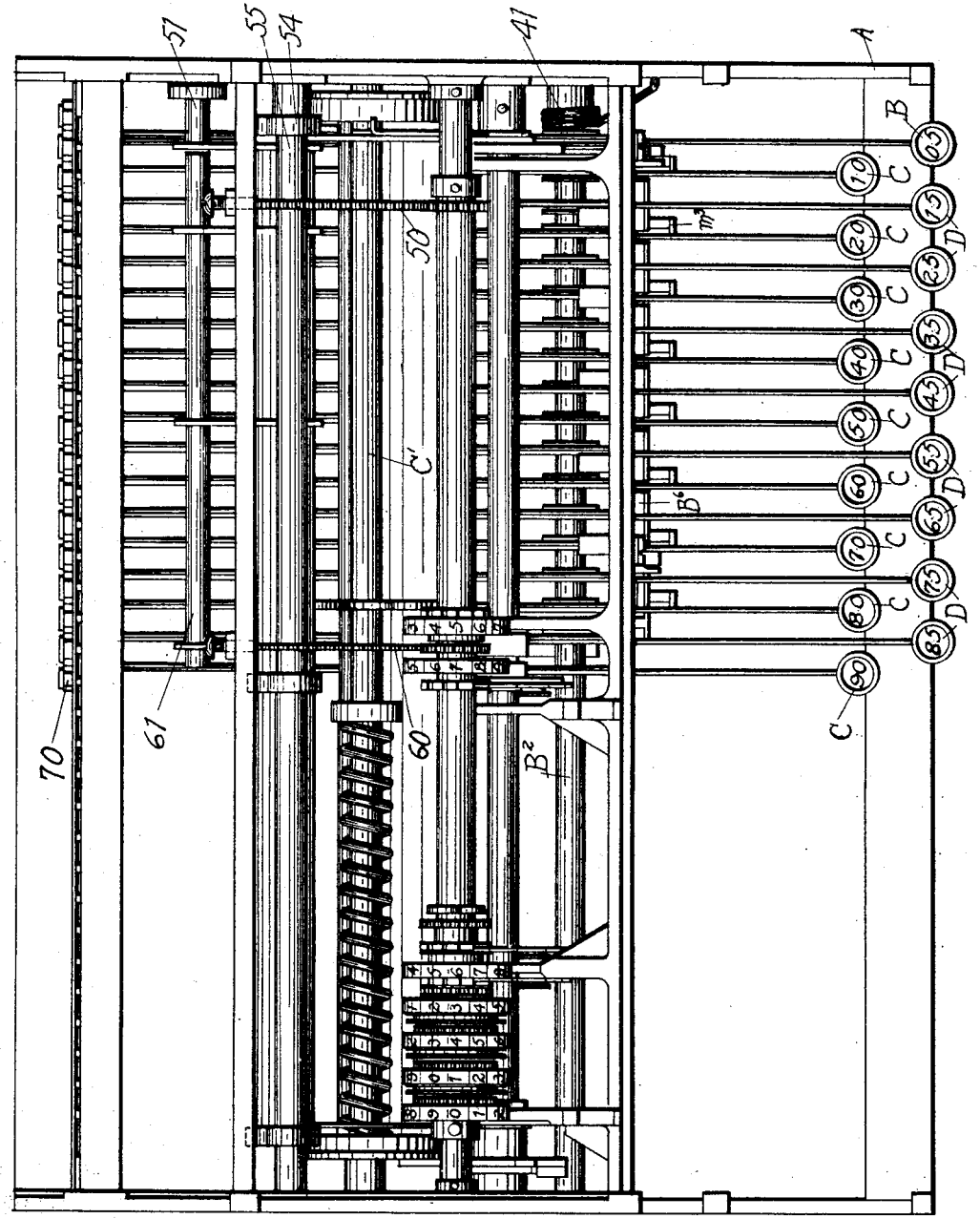

J. P. CLEAL.
CASH REGISTER.
APPLICATION FILED JAN. 15, 1912.

1,161,809.

Patented Nov. 23, 1915.
5 SHEETS—SHEET 1.

WITNESSES:
Paul A. R. Kroesing.
Stuart C. Barnes

INVENTOR.
Joseph P. Cleal
BY
Ralgemond A. Parker
ATTORNEY.

J. P. CLEAL.
CASH REGISTER.
APPLICATION FILED JAN. 15, 1912.

1,161,809.

Patented Nov. 23, 1915.
5 SHEETS—SHEET 2.

WITNESSES:
Paul A. R. Kroesing.
Stuart C. Barnes

INVENTOR.
Joseph P. Cleal
BY
Rulgemond A. Parker
ATTORNEY.

J. P. CLEAL.
CASH REGISTER.
APPLICATION FILED JAN. 15, 1912.

1,161,809.

Patented Nov. 23, 1915.
5 SHEETS—SHEET 3.

WITNESSES:
Paul A. R. Kroesing.
Stuart C. Barnes

INVENTOR.
Joseph P. Cleal
BY
Raymond A. Parker
ATTORNEY.

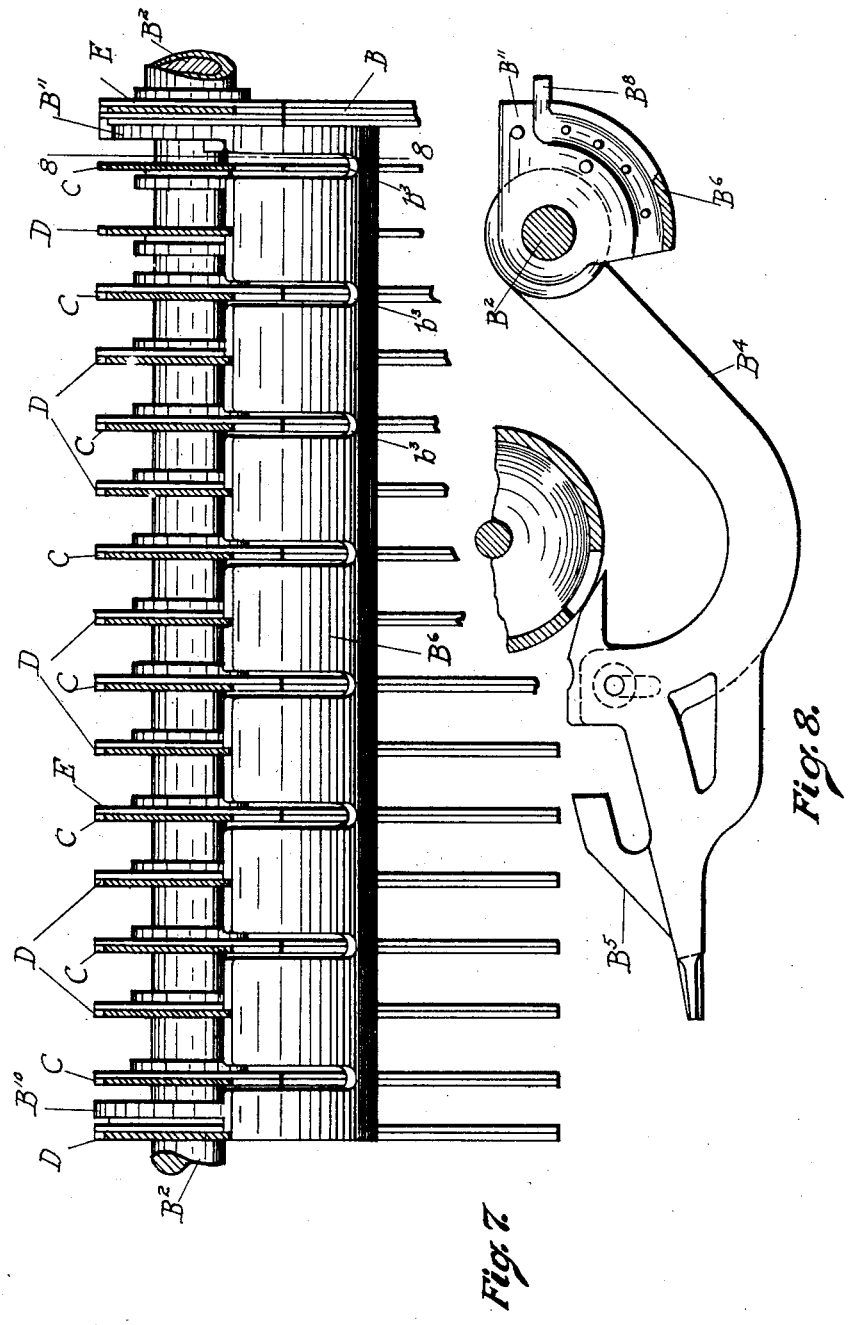

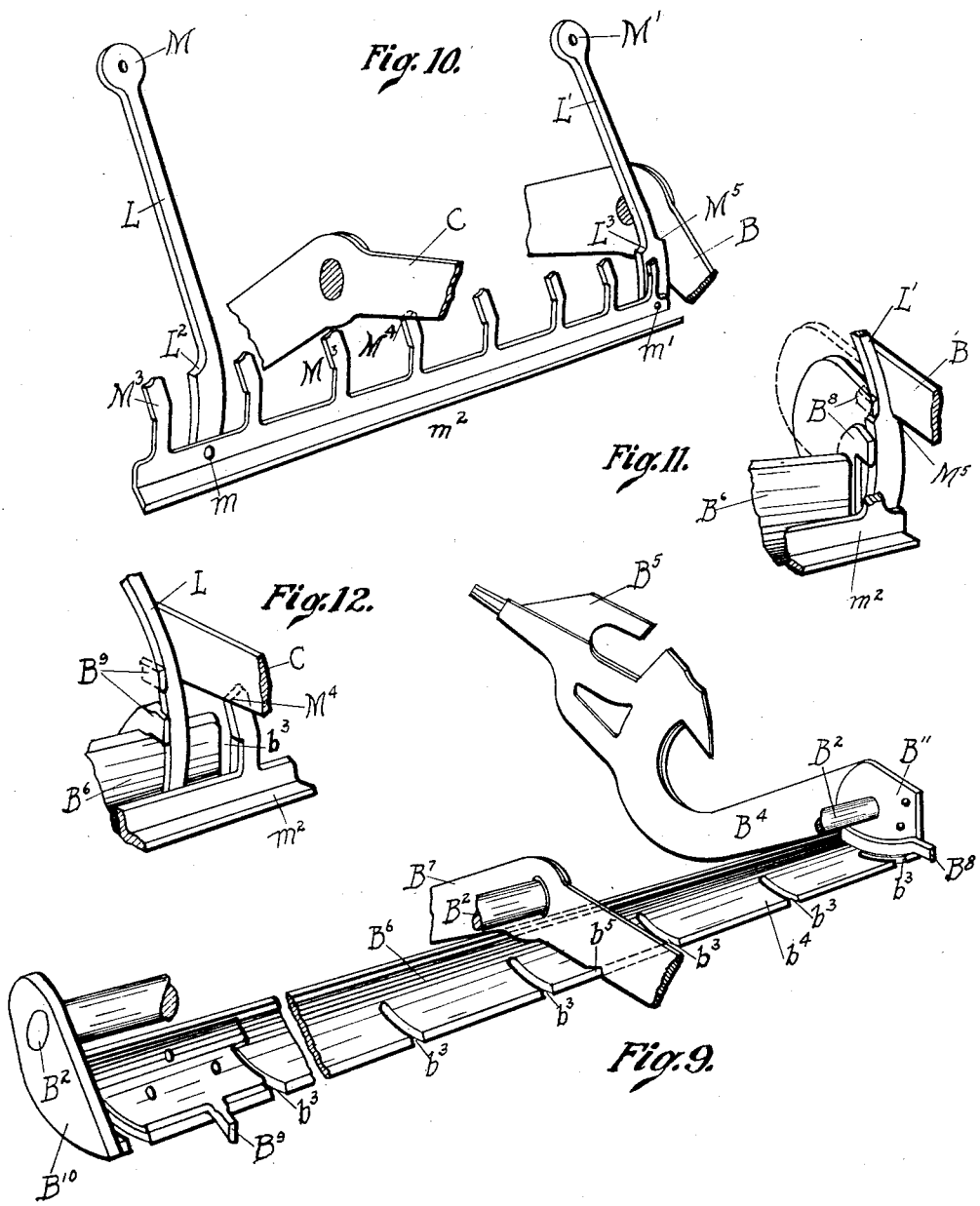

UNITED STATES PATENT OFFICE.

JOSEPH P. CLEAL, OF TORONTO, ONTARIO, CANADA, ASSIGNOR, BY MESNE ASSIGNMENTS, TO HUGH CHALMERS, OF DETROIT, MICHIGAN.

CASH-REGISTER.

1,161,809. Specification of Letters Patent. Patented Nov. 23, 1915.

Application filed January 15, 1912. Serial No. 671,294.

*To all whom it may concern:*

Be it known that I, JOSEPH P. CLEAL, a subject of the King of Great Britain, residing at Toronto, county of York, Province of Ontario, Canada, have invented a certain new and useful Improvement in Cash-Registers, and declare the following to be a full, clear, and exact description of the same, such as will enable others skilled in the art to which it pertains to make and use the same, reference being had to the accompanying drawings, which form a part of this specification.

This invention relates to cash registers and has for its object a novel five cent key arrangement. A bank of ten cent keys such as the ten, the twenty, etc. is provided, and also a bank of five cent keys, that is a five cent key and the odd multiple of five cent keys. The latter bank is divided into two divisions of which the five cent key itself forms one division and the odd multiple of five cent keys form the other division. The keys of the ten cent bank and the keys of the odd multiple of five cent division of the second bank are provided with locking devices, so that two keys of the ten cent bank or two keys of the odd multiple division of the five cent bank cannot be pressed at one time, and hence are not combinable, nor is one key from each bank combinable with any other key from the other bank. Combined with these locking-out devices is a novel locking-out member that is adapted to lock out the five cent key so that it cannot combine with certain of the odd multiples of five cent keys and certain of the ten cent keys. However, this locking-out member is so designed that it allows the five cent key to combine with certain of the ten cent keys, as for instance, the ninety cent key, so that ninety-five cents is registered by the combination of ninety cents and five cents and the ninety-five cent key is thus dispensed with to make room for a one dollar key or other keys. The register would register accurately, if a combination of keys were allowed to be pressed, but there would be confusion in the indicators by some overlapping others.

The odd multiples of five cent keys are arranged to operate by actuating the regular five cent segment and the regular ten cent segment of the register. This is accomplished by providing five cent connecting mechanism with each odd multiple of five cent key, so that with each actuation of the odd multiple of five cent key, actuation is given to the five cent segment and the proper actuation corresponding to the value is given to the ten cent segment.

Figure 3:
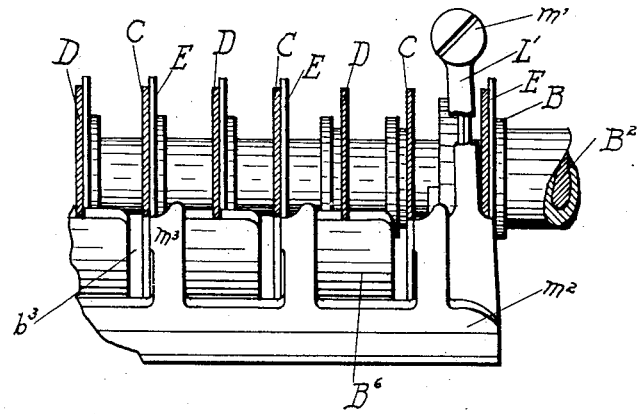
Figure 2:
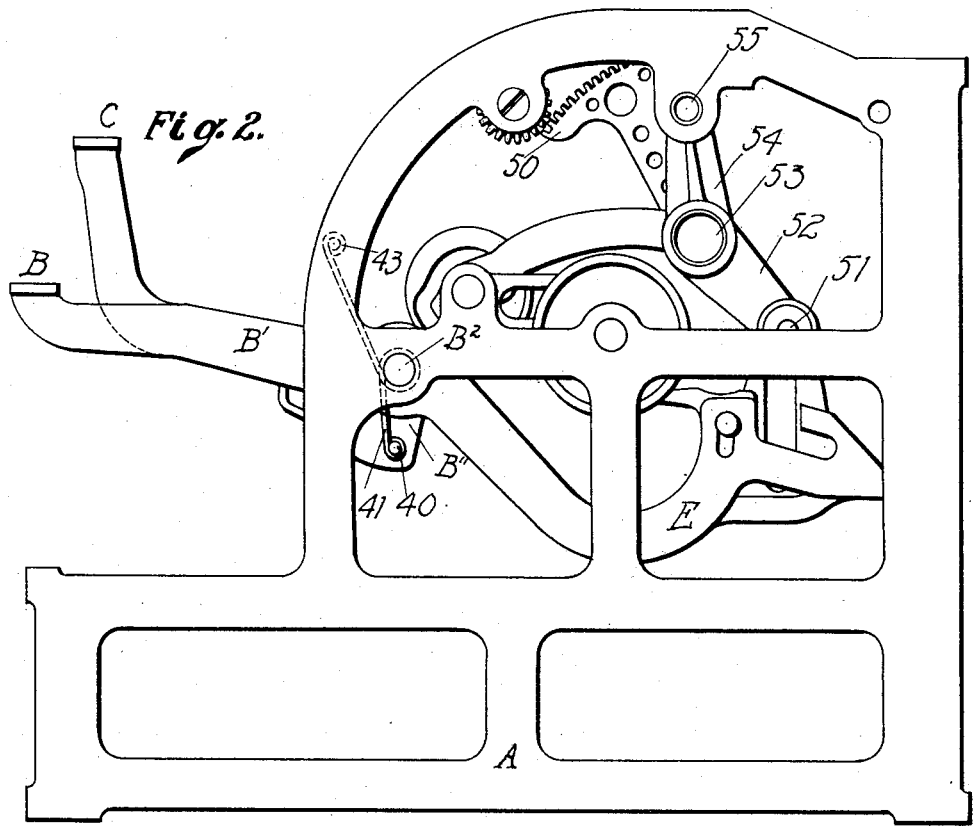
Figure 4:
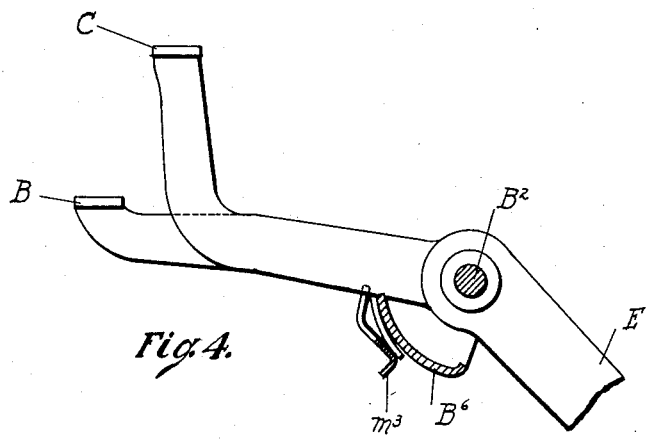
Figure 5:
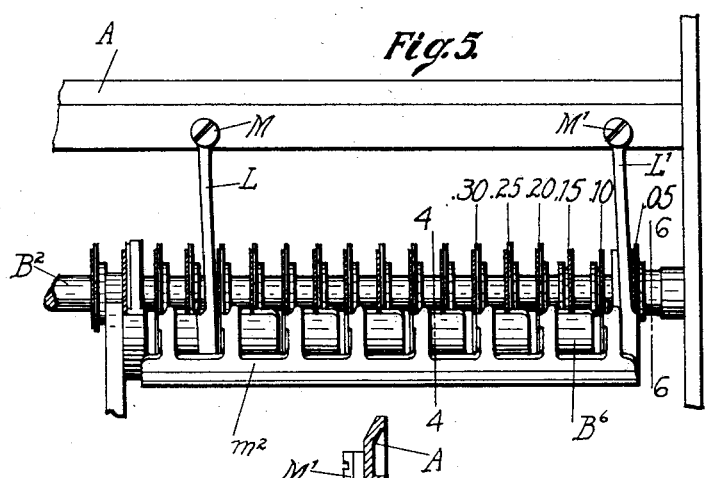
Figure 6:
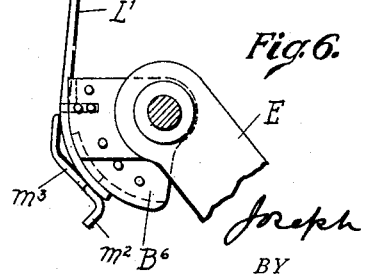

In the drawings:—Figure 1, is a plan view of the cash register containing my improvements. Fig. 2, is an end view of Fig. 1 viewed from the right of that figure and the top of the sheet. Fig. 3, is a partial front view (from the right of Fig. 1) showing details of the improved mechanism for locking the keys and preventing combined operation thereof. Fig. 4, is a cross section on the line 4—4 of Fig. 5 looking at it from the right. Fig. 5, is a front view of a portion of the key-board mechanism showing the locking device with interfering portions of the mechanism removed in order to show the locking device clearly. Fig. 6, is a cross section on the line 6—6 of Fig. 5, viewed from the right. Fig. 7, is a partial plan view of the keys and connecting parts with some of the interfering parts removed in order to show the mechanism more distinctly. Fig. 8, is a cross section of Fig. 7 on the line 8—8. Fig. 9, is a perspective illustration of means for operating the five cent segment in connection with the ten cent segment. Fig. 10, is a perspective of one of the locking out devices. Figs. 11 and 12, are detail figures of parts of Fig. 10.

As distinguished from my former application, Serial No. 571,115 this device while employing the same general mechanism for operating the keys and indicating the amounts respectively, yet contains peculiar modifications in this:—I employ two banks of keys, the lower of which beginning at the right is intended to represent five cents and then following thereafter the multiples of five by odd numbers as 5, 15, 25, 35, etc. the upper bank of keys commences with ten, and is continued by multiples of 10, as 10, 20, 30, etc. The effect of using the keys in combination is that the key for five cents and the key for ten cents, if each are actuated registers the same as the key for fifteen cents and so on with any multiples.

A represents the frame of the machine which is similar to the frames of machines of like character, except that it is formed so as to properly receive and secure operation of the inclosed mechanism.

B, represents the five cent key; C, the ten cent key; these are in a sense representative of the bank of keys shown in Fig. 1, and the relation of the keys to each other as well as to the banks being therein shown. It will be noted that between the 5 and 15 cent keys is the upper ten cent key as C, that the twenty cent key is located between the fifteen and the twenty-five cent key and so on.

$B^1$, is the key lever of the five cent key B which is pivoted inside of the frame on the key shaft $B^2$. The key shaft $B^2$ carries all the key levers and consists of a metal rod passing from side to side of the frame work upon which all of the keys are rotatably mounted. The keys are properly spaced from each other and held so that their paths of movement are vertical and without any tendency to side motion by a slotted plate (not shown) that forms part of the cabinet of the register and is familiar to all acquainted with the art. The five cent key B has a companion member E, as shown in Fig. 2. The companion member E being constructed with a lost motion coupling with the key for the purposes described in my application No. 571,115. As this is no part of my present invention, it is only necessary to refer to it here by saying that the mechanical operation of E to actuate the registering mechanism is the same with all of the banks of keys.

In order, however, that the five cent actuating mechanism shall register whenever any odd multiple of five cents is to be indicated, a second or what I shall designate as a common five cent key lever $B^4$ of exactly the same shape as the regular five cent key lever, but not extending beyond the key shaft at the front. This common five cent key is actuated by the mechanism of the other keys in the manner in which I will hereinafter describe, and is provided with the companion member $B^5$ like the other keys. On the key shaft $B^2$ is fixed a sector shaped hanger $B^{11}$, which is turned up or flanged on the end of a portion of a part cylinder $B^6$ (Figs. 8 and 9) that I shall designate for the sake of clearness, the five cent key connector. A spring 41 is fastened to the pin 40 on the sector-shaped hanger $B^{11}$ (Fig. 2) and coiled about the key shaft $B^2$. Its other end is fastened to some fixed member as the frame at 43. This insures the common five cent key lever and connector returning to initial position, after being operated.

The part-cylinder $B^6$ is concentric with the center of the key shaft $B^2$ and of course when revolving, revolves around $B^2$ as a center of motion by virtue of its being fixed to the common five cent key $B^4$. At the opposite end of this part cylinder $B^6$ is an integral sector shaped hanger $B^{10}$ journaled upon the key shaft $B^2$. This five cent key connector is slotted transversely at $b^3$, $b^3$. Its upper edge $b^4$ in which these slots occur is so adjusted that the lever portions as $B^1$ of all of the keys containing odd multiples of five cents rest thereon, as shown at $b^5$ (Fig. 9) and as the connector $B^6$ is adapted to partially revolve the depression of any odd multiple of the five cent keys will cause it to partially revolve and by means of its being attached to the common five cent key $B^4$, it will operate the five cent segment 50 (Fig. 2). The common five cent key $B^4$ actuates the short lock rod 51 (Fig. 2) that is hung by the arms 52 from the segment shaft 53, that is in turn suspended by the stirrups 54 from the fixed rod 55 in the manner set out in my said application, 571,115. Both the common five cent key $B^4$ and the regular five cent key and their respective companion members operate this lock rod and segment.

Each of the keys D, the odd multiples of five cents, and companion members E is adapted to actuate the lock bar 61 and the ten cent segment 60 (Fig. 1), as for instance, in registering, the fifteen cent key actuates through the five cent key connector $B^6$ the common five cent key $B^4$ and also by virtue of its own arm projecting beyond the bearing $B^2$, it actuates the ten cent segment and thus the sum of the two is thereby indicated, to wit, fifteen cents. This statement is true with regard to the 25, 35 cents, etc.

In Figs. 9, 10, 11, and 12, I have shown the locking out devices adapted to prevent certain combinations of keys being pressed instead of the single key, so that the indicators are kept free from confusion. These figures are to be read in connection with Figs. 3, 4, 5, 6, 7, and 8. The locking out device essentially consists of a locking-out-bar $m^2$, shown more particularly in perspective in Fig. 10 and the usual locking out hangers or disks as hereinafter described. This locking-out-bar $M^2$ consists of two depending hangers or two depending links L, L'; the upper ends of which are at M, M' pivoted to the frame A of the machine as shown in Fig. 5. The lower ends are pivoted at $m$, $m'$ to the bar itself; this bar has substantially vertical projecting spurs $M^3$, $M^3$ rising from its upper edge and of a sufficient number to be contiguous to each alternate key, which keys are lettered C in the drawings and are the ten cent series, i. e. multiples of ten cents. These keys together with the keys D which are multiples by odd numbers of the five cent series as 15, 25, etc. are shown in cross section in Fig. 5. A sufficient number of which are marked 10, 15, 20, 25, etc. to indicate the series.

The locking-out-bar $m^2$ carrying the spurs $M^3$, $M^3$, is hung directly in front of the five cent key connector $B^6$ carrying slots $b^3$, $b^3$. The spurs $M^3$, $M^3$, are arranged so that, as shown in Fig. 12, their upper portions project to the left so that normally they would interfere with the key dropping into a slot $b^3$ of the connector $B^6$. If, however, there is no other key depressed at the time when any one key of the ten cent series is depressed, it impinges upon the top and sloping edge $M^4$ of any one of the projections, as shown in Fig. 12 and immediately pushes the whole locking-out-bar, swinging on the links L, L', to the right a sufficient distance to permit the key to descend into the slot $b^3$. Obviously, this does not compel the bar $B^6$ to rotate and therefore does not, as hereinbefore explained, actuate the five cent key. The locking-out-bar $m^2$ being thus swung to the right brings a projection $M^5$, (Fig. 11) which is formed on the lower end of the link L' underneath the five cent key and in this manner locks or prevents the five cent key from descending, until the locking-out-bar is again free to swing to the left. All the other keys including both D and C, either two from one bank, or one from each bank, are locked from combining by the swinging disks or stops 70, described in my application No. 571,115, and which are well known to those acquainted with the art and are fully described in said application.

The manner of causing the locking-out-bar to swing has been described with respect to the keys C or ten cent keys, and I will now describe how the keys D or the odd multiple five cent keys swing the bars. At the lower end of the two links L and L' on the left sides they are widened at $L^2$, $L^3$, with sloping shoulders as shown in the Fig. 10. When the locking-out-bar $m^2$ is swung to extreme left, the projections $B^8$ and $B^9$ on the connector $B^6$, that is actuated by any one of the keys D, slide down against the shoulders $L^2$ and $L^3$ and thereby swing the locking-out-bar $m^2$ to the right and locks out the five cent key B by reason of the shoulder $M^5$ being held in its path (Fig. 11). The locking bar is returned to its left hand position when the five cent key B is operated. Until this key is operated it remains in its right hand position and then the keys C and D do not serve to swing it but prevent it returning to its left hand position; thus locking out the five cent key B.

When a ten cent key is depressed as hereinbefore stated, it passes into a corresponding slot $b^3$ of the connector $B^6$ and thus does not actuate the common five cent key.

By making the locking-out-bar $m^2$ shorter and not providing a spur for any one key, such as the 90 cent key for example, this key, of course, will not lock out the five cent key B and hence is combinable with it in place of a 95 cent key, thereby, affording more room for dollar or other keys. The dispensing of one or two odd multiples of five keys does not confuse the indicators for which purpose, as explained above, the locking out of the five cent key was designed.

What I claim is:—

1. In a cash register, the combination of a five cent registering segment, a ten cent registering segment, separate segment lock bars for each segment, an odd multiple of five cent key, a common five cent key lever, and a five cent key lever connector adapted to connect the key with the five cent lock bar simultaneously with the key actuating the ten cent segment lock bar, substantially as described.

2. In a cash register the combination of a five cent registering segment, a plurality of odd multiples of five cent keys, a common five cent key lever, lost motion mechanism carried by the common five cent lever, a single five cent key lever, lost motion mechanism carried by the single five cent key lever, the single five cent key lever being actuated to independently operate the five cent registering segment.

3. In a cash register, the combination of a five cent registering segment, a lock-rod connected therewith, a plurality of odd multiples of five cent keys, a common five cent key lever actuable by odd multiples of five cent keys and adapted to engage with the lock-rod, and a five cent key actuable to independently actuate and engage with the lock-rod, substantially as described.

4. In a cash register, the combination of a common five cent key lever, a lost motion mechanism carried by the key lever and means for returning the key and its lost motion mechanism to its initial position after actuation, substantially as described.

5. In a cash register, the combination of a common five cent key lever, the lost motion mechanism carried by the key lever and a spring for returning the key and the lost motion mechanism to its initial position after actuation, substantially as described.

6. In a cash register, the combination of a common five cent key lever, a registering segment, a lost motion mechanism carried by the key lever adapted to engage the segment and means for returning both the key lever and the lost motion mechanism to their initial positions after actuation, substantially as described.

7. In a cash register, the combination of a common five cent key lever, a registering segment, a lost motion mechanism carried by the key lever adapted to engage the segment, a five cent key lever connector, and a spring for returning both the key lever and the lost motion mechanism to their initial positions after actuation, substantially as described.

8. In a cash register, the combination of a common five cent key lever, a key shaft upon which the same is pivoted, a five cent key lever connector in the shape of a slotted part cylinder, hangers for supporting said connector on said key shaft so as to swing concentrically thereto, a pin on one of said hangers and a spring at one end fastened to said pin and at the other end fastened to some fixed member, substantially as described.

9. In a cash register, the combination of ten cent keys and odd multiples of five cent keys provided with the usual locking out devices to prevent combining of keys, a five cent key, and a pendant swinging bar carrying spurs adapted to be engaged by one of the said first mentioned keys to swing the bar laterally and into the path of the five cent key to lock the same out.

10. In a cash register, the combination with keys of swingingly suspended links, a locking out bar provided with spurs and a shoulder and carried by said links, the spurs adapted to be struck by the keys to shift the bar and the shoulder adapted to lock out a key, substantially as described.

11. In a cash register, the combination of several banks of keys, a locking out bar provided with spurs and shoulders, a connector provided with projections and operated by one bank of keys, the spurs being adapted to be contacted by the keys not operating the connector to operate the locking out bar and the shoulders adapted to be contacted by the projections on the connector to operate the locking out bar, substantially as described.

12. In a cash register, the combination of several banks, a locking out bar provided with spurs and shoulders, a connector provided with projections and operated by one bank of keys, the spurs being adapted to be contacted by selected keys of the keys not operating the connector and the shoulders adapted to be contacted by the projections on the connector to operate the locking out bar, substantially as described.

13. In a cash register, the combination of several banks of keys a locking out bar provided with spurs, links having shoulders and adapted to suspend the locking out bar swingingly, a connector provided with projections and operated by one bank of keys, the spurs being adapted to be contacted by the keys not operating the connector and the shoulders on the link adapted to be contacted by the projections on the connector to swing the locking out bar, substantially as described.

14. In a cash register, the combination of several banks of keys, a locking out bar provided with spurs, links having shoulders and adapted to swing the locking out bar, a connector provided with a projection and operated by one bank of keys, the spurs being adapted to be contacted by the keys not operating the connector and a shoulder on the links adapted to be contacted by the projection on the connector and a shoulder on the links adapted to act as a key stop or lock out, substantially as described.

15. In a cash register, the combination of a key lever, such as the five cent key lever, a connector therefor, a key such as the five cent key, two banks of keys, one bank operating the key lever through the connector, means operated by the other bank of keys for locking out the first mentioned keys and means operated by the connector for locking out said first mentioned key, substantially as described.

16. In a cash register, the combination of a common five cent key lever, odd multiples of five cent keys, a connector for communicating the operation of an odd multiple of a five cent key to the common five cent key lever, a five cent key and means operated by the connector for locking out the five cent key and preventing its combining with the odd multiples of five cent keys, substantially as described.

17. In a cash register, the combination of a common five cent key lever, odd multiples of five cent keys, a connector for communicating the actuation of one of the odd multiples of five cent keys to the common five cent lever, a five cent key, a shifting lockbar adapted to be engaged by a portion of the connector when the same is operated and to be shifted into the path of the five cent key to lock the same out and prevent its combining with the odd multiples of five cent keys, substantially as described.

In testimony whereof, I sign this specification in the presence of two witnesses.

JOSEPH P. CLEAL.

Witnesses:
VIRGINIA C. SPRATT,
STUART C. BARNES.

Copies of this patent may be obtained for five cents each, by addressing the "Commissioner of Patents, Washington, D. C."